United States Patent

[11] 3,601,965

[72] Inventors Heinrich Kaessbohrer
Berkeley;
Darrell C. Horn, Lafayette, both of, Calif.
[21] Appl. No. 864,127
[22] Filed Oct. 6, 1969
[45] Patented Aug. 31, 1971
[73] Assignee Up-Right, Inc.
Berkeley, Calif.

[54] HARVESTING MACHINE WITH FLEXIBLE CLOSURE
19 Claims, 11 Drawing Figs.

[52] U.S. Cl. ................................................. 56/330
[51] Int. Cl. ............................................. A01g 19/00
[50] Field of Search ........................................ 56/330,
331, 30, 27.5; 198/204

[56] References Cited
UNITED STATES PATENTS
2,489,963 11/1949 Henley ........................ 56/30

| | | | |
|---|---|---|---|
| 3,165,879 | 1/1965 | Chapin ........................ | 56/330 |
| 3,449,895 | 6/1969 | Pertics ........................ | 56/330 |
| 3,473,311 | 10/1969 | Fox .............................. | 56/330 |
| 3,507,103 | 4/1970 | Pickett et al. ............... | 56/27.5 |

*Primary Examiner*—Russell R. Kinsey
*Attorney*—Mellin, Moore & Weissenberger

ABSTRACT: A harvesting machine which straddles and moves along a row of fruited plants, such as grapevines, and is provided with a pair of resilient closure members underneath the plants to catch the fruit knocked from the plants. The closure members are flexible and have a lesser resistance to upward flexing at their inner edges than at their outer edges. The inner edges of the closure members are scalloped in the plane of the members, pleated and overlapped along the centerline of the plants so that the trunk or plant support can pass between the overlapped edges with a minimum of opening of the closure members. Additionally, the closure members are free to move in unison transversely of the machine so that they will remain centered on the row of plants in spite of steering errors or tilting of the machine.

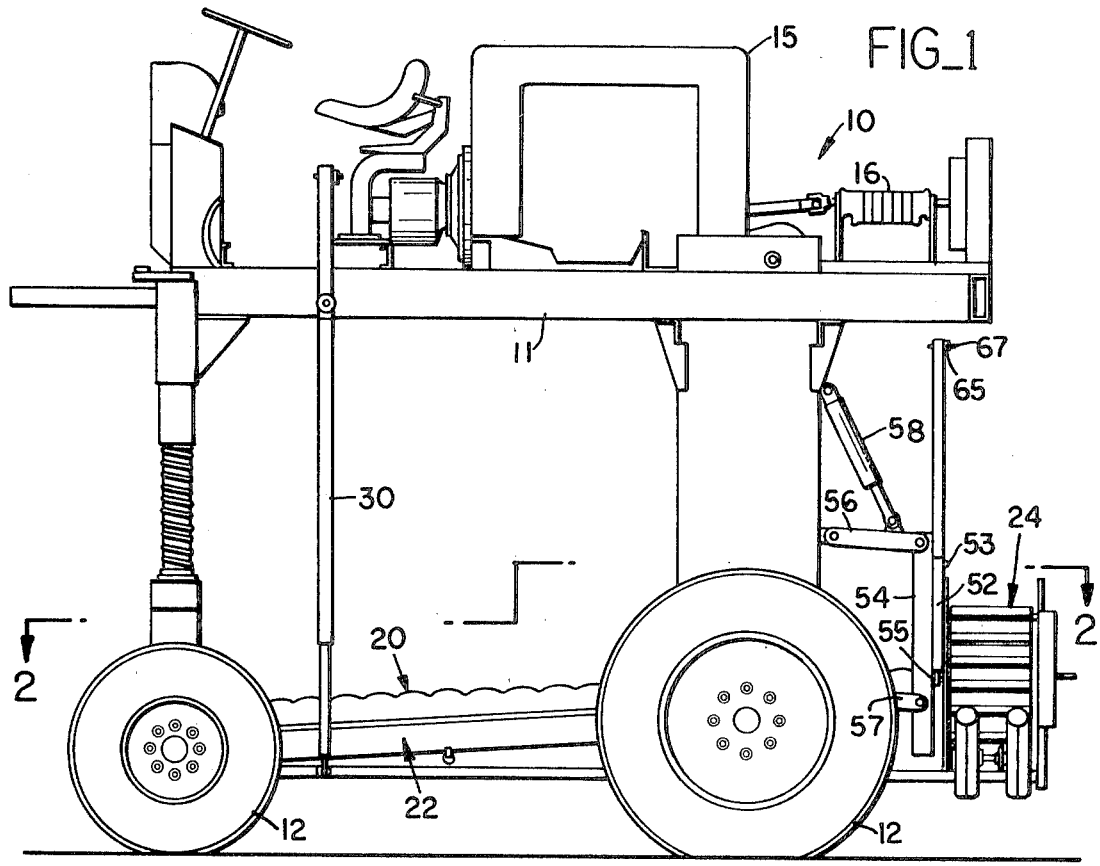
FIG_1
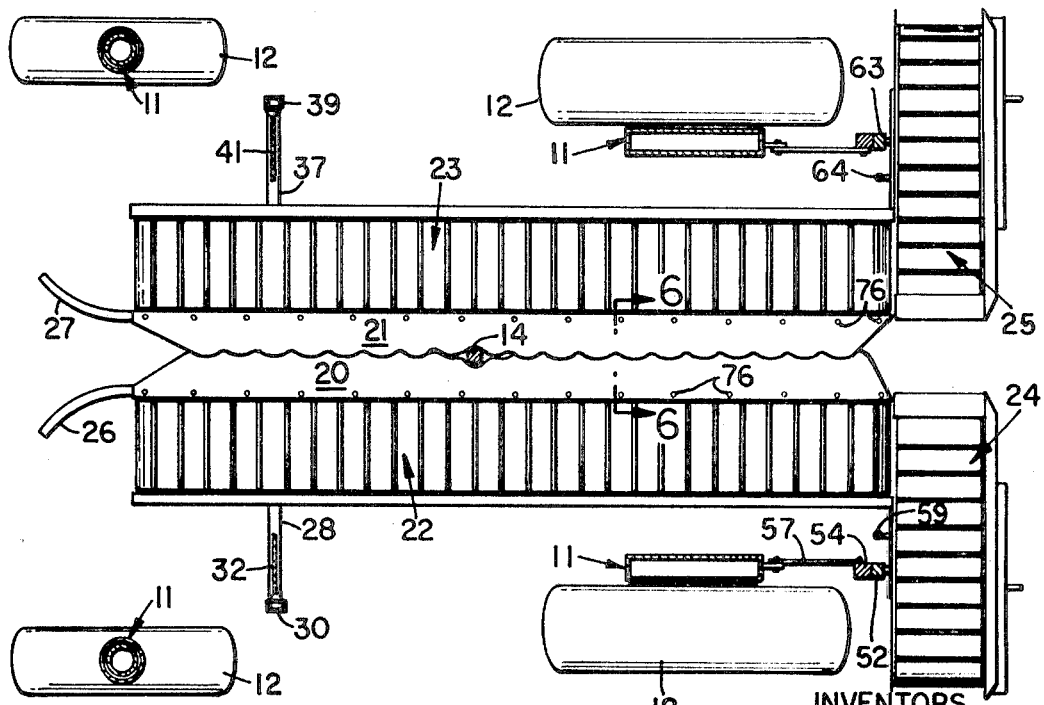
FIG_2
INVENTORS
HEINRICH KAESSBOHRER
DARRELL C. HORN
BY
Mellin, Moore + Weissenberger

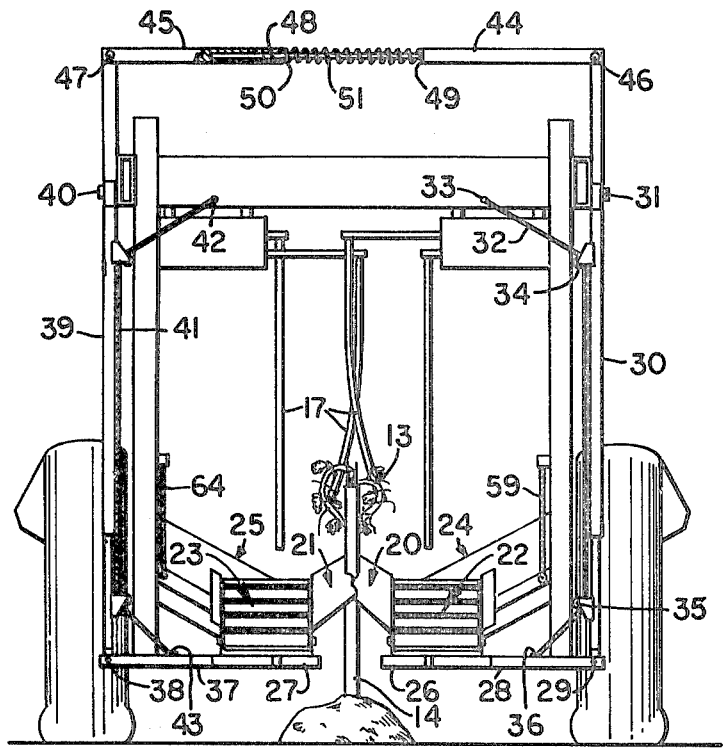
FIG_3
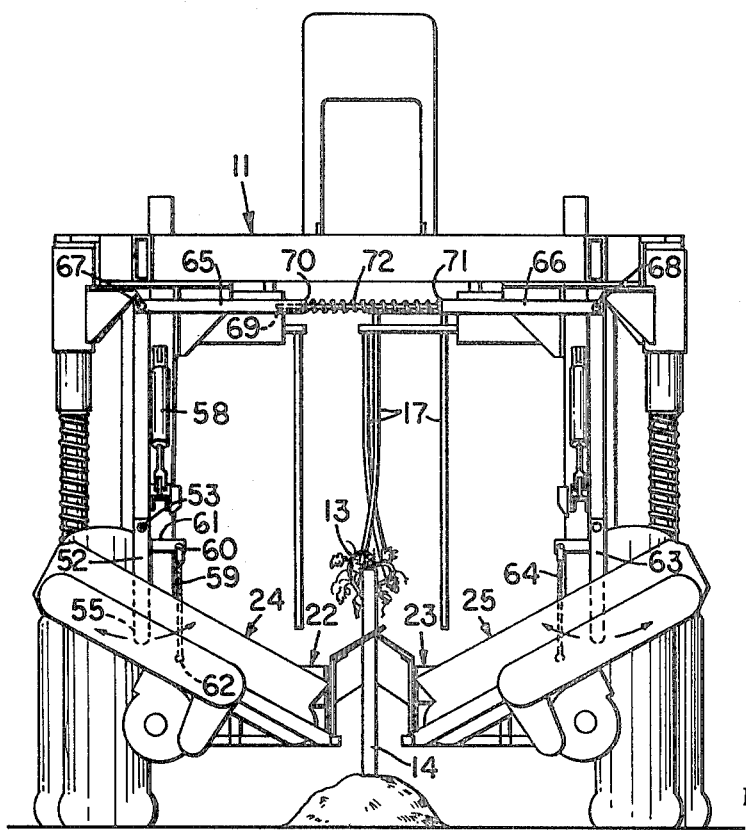
FIG_4

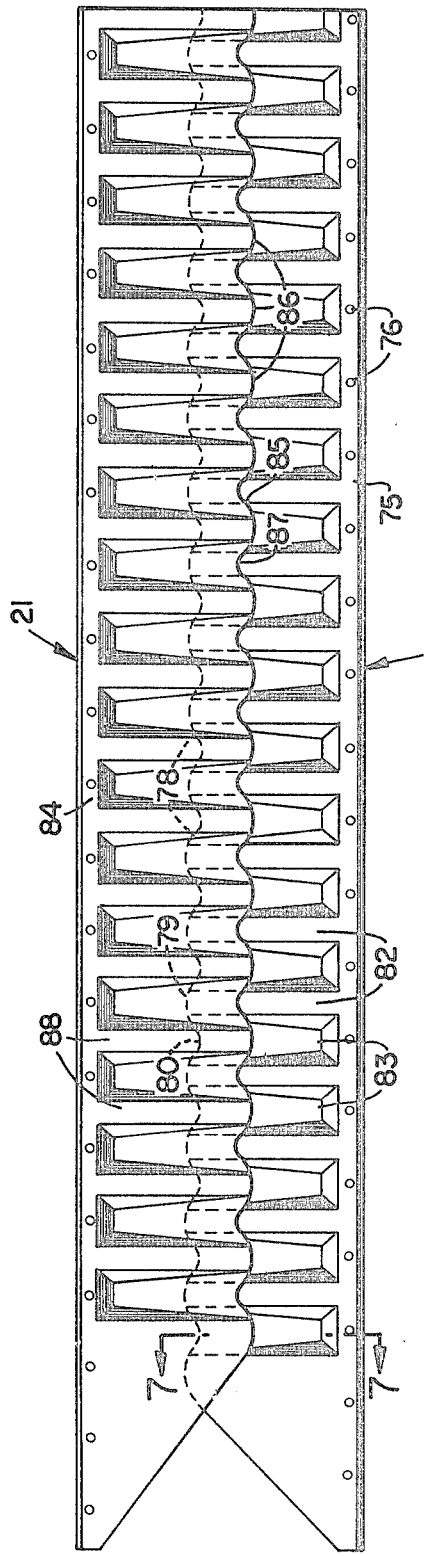
FIG_5
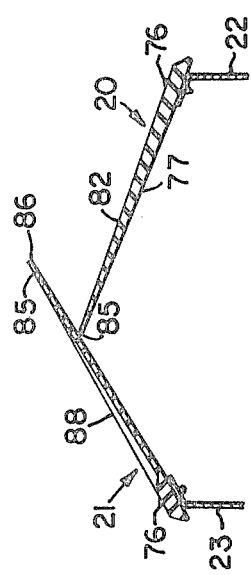
FIG_6
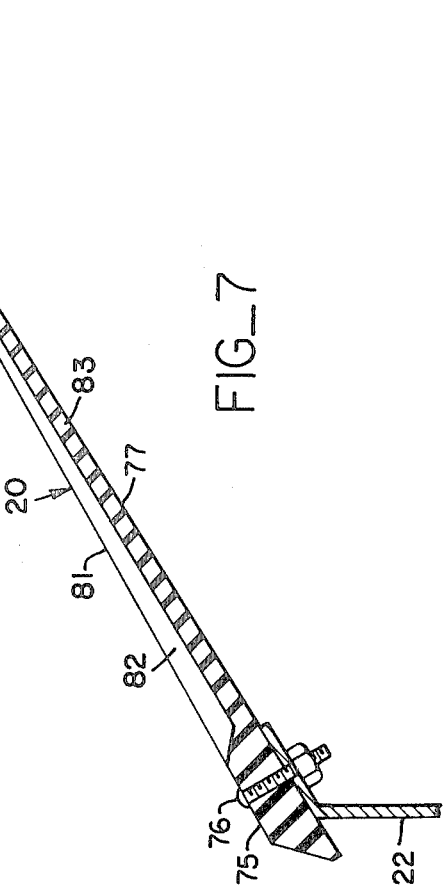
FIG_7
INVENTOR.
HEINRICH KAESSBOHRER
DARRELL C. HORN
BY
Mellin, Moore & Weissenberger
ATTORNEYS

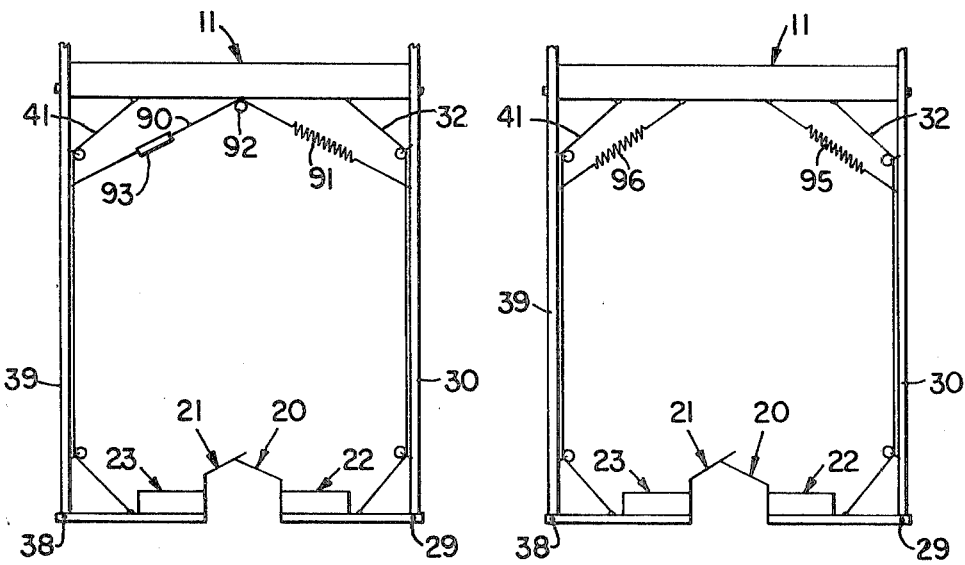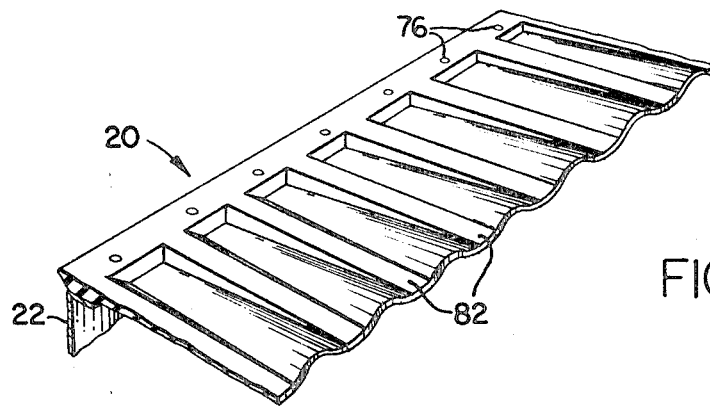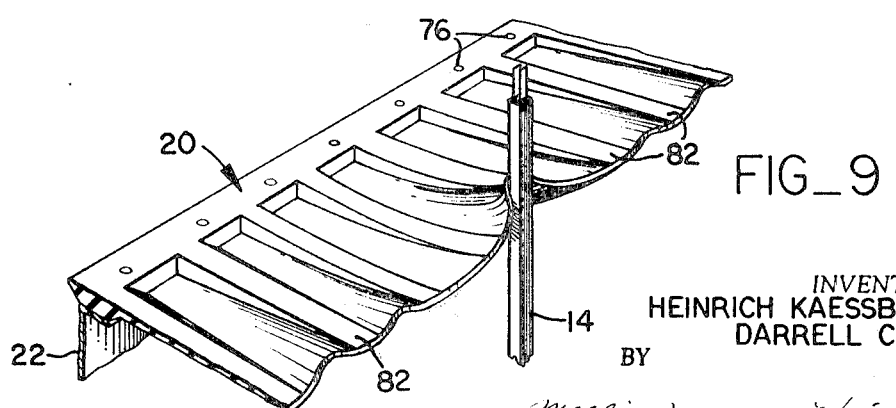

3,601,965

HARVESTING MACHINE WITH FLEXIBLE CLOSURE

BACKGROUND OF THE INVENTION

This invention relates to fruit-harvesting machines of the type that straddle and move along a row of fruit-bearing vines or bushes to harvest the fruit therefrom. Such machines have shaking or striking means to dislodge the fruit from the plants, so that the fruit drops toward the ground. In order to gather the fruit, a closure means must be provided between the plants and the ground to intercept the falling fruit and direct it to the conveyors of the machine. If an efficient closure is not provided, a portion of the fruit will fall therethrough onto the ground and be wasted. The provision of an efficient closure is made difficult since a large amount of the fruit drops on the centerline of the row, or at the location when the closure must be capable of opening to allow the passage therethrough of the trunks or posts that support the fruit-bearing portions of the plants.

The most efficient closure is one which will protrude under the plants, to the centerline of the row from either side, and, despite the movement of the machine and the closure carried thereby in either direction past the trunks and posts, will prevent the falling fruit from falling on the ground, and will divert the fruit, without damage, to each side of the machine so that it may be conveyed by belt conveyors or the like and be effectively harvested.

One approach to the problem is the mechanical array of pivoted shutters, shown in the U.S. Pat. No. 3,126,692 to Weygandt, issued Mar. 31, 1964. However, use of this device has shown the following deficiencies:

a. jamming is caused by berries and branches being caught between the shutters;

b. jamming is caused because of bending of the shutters by contact with angular branches on the trunks of vines;

c. failure because of broken parts;

d. failure due to lack of necessary lubrication of the pivoted shutters;

e. failure because of the sharp impact of the shutters when they return from their pivoted positions by the force of the steel springs;

f. failure because of contact of the shutters with the berm of ground which often protrudes upwardly beneath the row of vines or bushes;

g. damage to the fruit by the scissors action of adjacent shutters;

h. a unidirectional movement of the machine in the forward direction only, which prevents the machine from being backed out of a row.

Another approach to the problem, which is only partially effective, is the use of a pair of stiff rubber fins, meeting at the centerline of the row and each mounted at an angle to cause the falling fruit to roll or slide outwardly and downwardly to the conveyors, such as shown in the U.S. Pat. No. 3,165,879 to Chapin, issued Jan. 19, 1965. In practice, it has been found that if the rubber fins are stiff enough to extend outwardly at the desired angle, they are not flexible enough to wrap around the vine trunk or post as it rubs thereon during passage thereby. The stiffness causes excessive friction and wear on the fins. Also, a long, large gap is created between the mating edges of the fins when passing a trunk or post, with a consequent loss of fruit through this gap. Additionally, if a large post or trunk is encountered, one or both fins may bend down, rather than up, and spill all of the fruit on the ground. If the fins are made flexible enough to minimize the friction, wear and creation of a gap, then they are not stiff enough to catch the fruit at the angle necessary to divert the fruit outwardly onto the conveyors.

SUMMARY OF THE INVENTION

The present invention solves the problems described above by the use of a pair of flexible closure members with scalloped and overlapped inner edges. The protrusions of the edge of one member fit and overlap the scallops on the edge of the other member. The stiffness required to hold each closure member at the angle desired to divert the fruit outwardly is primarily provided by transversely extending stiffeners which render the members less resistant to upward flexing at their inner edges than at their outer edges where they are mounted to the conveyors. The flexibility of the closure members is thus such that the inner edges will wrap around the trunk or post without opening up a large gap between the members. The scallops and protrusions on the inner edges of the members are proportioned so that the typical-sized trunk or post is absorbed therebetween with a minimum of flexing of the rest of the closure members. The arrangement of the stiffening members permits the closure members to operate equally well in either direction of movement of the machine along the row.

Additionally, the transverse stiffeners are longitudinally spaced and the closure members are subjected to a compressive force along the scalloped edge so that the scalloped edge is pleated. The engagement of the posts or trunks with this pleated edge causes the closure members to wrap around the posts or trunks with a minimum of exposed opening between the two closure members.

The closure members are mounted on the machine in a laterally spaced relationship, suspended from above so that the closure can float sideways as the machine moves along the row, and thus seek the centerline of the row in spite of steering errors of the driver or tilting of the machine because of unevenness of the ground. A gap between the closure member is thus avoided as would be the case if a steering error would cause only one closure member to contact the trunk or post. Since the closure members are free floating, the closure as a whole moves to balance the lateral pressure on both closure members and centralize the closure on the row.

The overall flexibility of the closure in relation to unusual obstacles, the ground or inaccurate steering of the machine, provides efficient catching of the fruit and minimum maintenance expense. The flexibility of the closure members produces minimum friction as they rub by the trunks and posts. As the members flex around the trunks and posts, the inner edges of the members flex upwardly, increasing the angle and tending to roll or slide the fruit more effectively in an outward direction to the conveyors.

Other objects and advantages will become apparent in the course of the following detailed description.

BRIEF DESCRIPTION OF THE DRAWINGS

In the drawings, forming a part of this application, and in which like parts are designated by like reference numerals throughout the same, FIG. 1 is a side elevational view of a harvesting machine incorporating the invention, FIG. 2 is a sectional view of the machine of FIG. 1, taken on line 2—2 thereof, FIG. 3 is a front elevational view of the machine of FIG. 1 with the front wheels not shown, for purposes of illustration, FIG. 4 is a rear elevational view of the machine of FIG. 1, FIG. 5 is a plan view of the closure members alone, FIG. 6 is a sectional detail of the closure members, taken on line 6—6 of FIG. 2, FIG. 7 is a cross-sectional view of one of the closure members, taken on line 7—7 of FIG. 5, FIGS. 8 and 9 are perspective views of one of the closure members to illustrate the effect of the pleating of the scalloped edge thereof, FIGS. 10 and 11 are generally schematic illustrations of modifications of the floating suspension of the conveyors.

DESCRIPTION OF THE PREFERRED EMBODIMENT

The harvesting machine 10 comprises a generally tunnel-shaped frame 11 which is open at both ends so that the machine can straddle and roll, on wheels 12, along a row of bushes or vines, such as vines 13. These vines are typically trained along a wire which is supported by wooden posts 14.

The machine 10 includes an engine 15 that supplies power to the wheels 12 and the various conveyors and to a fluid pump 16 for the various hydraulic systems of the machine. Striker members 17 are also carried by the frame to strike against the vines 13 to dislodge the fruit therefrom. Since the details of the striker members and operating mechanism therefor form no part of the present invention, such members and mechanism are shown only in FIG. 3 and have been omitted from the other figures for purposes of simplification. A full disclosure of such devices is found in the copending application, Ser. No. 855,865, now abandoned, filed Sept. 8, 1969, of Gerald L. Claxton and Darrell C. Horn, entitled "Method and Apparatus for Harvesting Fruit with and Elliptically Moving Striker Member," which application has been assigned to the assignee of the present application.

The fruit dropping from the vines falls onto the two closure members 20 and 21 which extend lengthwise of the machine, and the fruit is directed outwardly to the conveyors 22 and 23 that extend and carry the fruit lengthwise of the machine to the rear conveyors 24 and 25. The latter conveyors carry the fruit upwardly at the rear of the machine to side conveyors (not shown) that in turn carry the fruit upwardly to a cross-conveyor (not shown) at the front of the machine, which in turn carries the fruit laterally of the machine to a truck.

The front ends of conveyors 22 and 23 are provided with guides 26 and 27 that are outwardly curved to intercept any upstanding projection that may be in the row which the machine traverses. Conveyor 22 is mounted to arm 28, which is pivotally connected at 29 to the upright member 30 which is pivotally mounted by a ball pivot 31 to frame 11. Cable 32, connected at its upper end 33 to frame 11, is trained over pulleys 34 and 35, mounted on upright 30, and is connected at its lower end 36 to arm 28. Similarly, conveyor 23 is mounted on arm 37, the latter being pivotally connected at 38 to upright member 39 which is pivotally connected at 40 to frame 11, and cable 41 is connected at its upper and lower ends 42 and 43 to frame 11 and arm 37. By this construction, the conveyors 22 and 23 are suspended from the frame for swinging movement transverse of the frame. Cables 32 and 41 serve to maintain arms 28 and 37, and consequently conveyors 22 and 23, horizontal in spite of such swinging movement.

Tie bars 44 and 45 are pivotally connected at 46 and 47 to the upper ends of upright members 30 and 39, and have a telescoping connection at 48. Shoulders 49 and 50 on these tie bars bear against compression spring 51 confined therebetween. If conveyor 22 were to move to the right, as seen in FIG. 3, the upper end of upright member 30 would move to the left, moving tie bars 44 and 45 to the left, in turn pivoting upright member 39 to cause conveyor 23 to move to the right with conveyor 22. Movement of conveyor 23 to the left will similarly cause leftward movement of conveyor 22. In the event that the machine passes a wider obstruction than posts 14, the two conveyors can both swing away from the centerline of the machine, such movement causing a compression of spring 51. After the obstruction has been passed, spring 51 will return the conveyors to their normal spaced-apart positions. The spring 51 is chosen of sufficient stiffness so that normal-sized obstructions, i.e., posts 14, will not compress the spring to any significant extent and the conveyors 22 and 23 will follow each other at a relatively constant distance therebetween.

The rear end of conveyor 22 is connected to the lower end of conveyor 24 for discharge thereinto. Conveyor 24 is suspended from the frame as follows. Upright member 52 is pivotally connected at 53 intermediate its ends to bracket 54 and at 55 to conveyor 22. Bracket 54 is secured to frame 11 by links 56 and 57 and may be raised or lowered as desired by the hydraulic piston device 58. Cable 59 is connected at 60 to extension 61 of bracket 54 and at 62 to conveyor 24. Thus, conveyor 24 and the front end of conveyor 22 is free to swing in a transverse direction of the machine. The parallelogram arrangement of pivots 53, 55, 60 and 62 assures that the conveyors will remain horizontal in spite of such transverse movement.

Similarly, conveyor 25 and the rear end of conveyor 23 are pivotally suspended from frame 11 for transverse swinging movement by upright member 63 and cable 64.

Tie bars 65 and 66 are pivotally connected at 67 and 68 to the upper ends of upright members 59 and 63, and have a telescoping connection 69. Shoulders 70 and 71 confine a compression spring 72 therebetween. As before, the tie bar arrangement causes the rear end of conveyor 23 to follow the swinging movement of conveyor 24, and vice versa, while also allowing such conveyors to spread apart to pass large obstructions.

The generally flat, elongated closure members 20 and 21 are formed of a flexible material, such as polyurethane. Closure member 20 is mounted at its outer edge 75 to the inner edge of conveyor 22 by bolts 76 so that the lower smooth surface 77 of closure member 20 is upwardly inclined towards the centerline of the machine. The inner edge 78 of closure member 20 is scalloped along its length to form peaks 79 and valleys 80. As will be seen from FIG. 5, the upper surface 81 of closure member 20 is provided with a plurality of transverse ribs 82 integral therewith. These ribs 82 and the portions 83 of the closure member 20 therebetween decrease in thickness towards the inner edge 78 of the closure member so that the member has a lesser resistance to upward flexing at its inner edge than at its outer edge.

Closure member 21 is similarly made and is mounted at its outer edge 84 to conveyor 23. Again the inner edge 85 of closure member 21 is scalloped along its length to form peaks 86 and valleys 87 and the closure member is provided with transverse stiffening ribs 88 spaced along its length.

The inner edges of the closure members are overlapped so that the peaks and valleys of the upper member overlie the valleys and peaks of the lower closure member. This disposition also causes the transverse stiffening ribs 82 and 88 to be longitudinally staggered with respect to each other.

The closure members are secured to the conveyors in such manner that the scalloped inner edges of the closure members will also be pleated. This can be easily accomplished by one of two ways, as desired. First, a closure member can be formed with the holes along its outer edge for bolts 76 located relative to the outer edge such that a line drawn through the centerlines of the holes will form an arc, with the holes at the ends being closer to the outer edge than the holes in the middle. For a closure member of approximately 10 feet in length and 13 inches in width, the curvature of such arc should be approximately 2 inches in 10 feet. Mating holes in the conveyor, for bolts 66, are formed with their centerline lying in a straight line. In bolting the closure member to the conveyor, the center thereof is drawn outwardly relative to the ends, in the plane of the closure member. Alternatively, the bolt holes in the outer edge of the closure member can be in a straight line, and the bolt holes in the conveyor be formed in an arc. In either event, the result will be that the ends of the inner edge will be forced longitudinally towards each other, resulting in the impression of a longitudinal compressive force distributed along the inner edge. The effect of this compressive force is to buckle the inner edge. However, instead of having one large buckle, the longitudinally spaced stiffening members cause the buckling to be distributed along the inner edge and between the stiffening members 82 so that the scalloped edge assumes a pleated appearance, as illustrated in FIG. 8.

In passing by a post 14, the pleated edge flexes up where engaged by the post, as illustrated in FIG. 9. In so doing, the pleats flatten out in the vicinity of the post to accommodate this flexing, with a minimum effect on the remainder of the inner edge. Thus, there will be a minimum gap opened up between the closure member as a post is passed, and the closure member will "wrap around" such post. The smooth lower surfaces of the closure members wipe against the post as they pass thereby with a minimum of abrasion to the post. The flexing of the closure members around the posts also assists in urging the fruit on the closure members downwardly therealong to the conveyors.

Although the transverse stiffening members are shown as integrally molded ribs, it is to be appreciated that the same result can be achieved by the use of spring steel fingers or the like, secured to the bottom or embedded in the closure members.

FIGS. 10 and 11 illustrate alternative ways in which the conveyors 22 and 23 may be mounted for free-floating movement. In FIG. 10, the upright members 30 and 39 are tied together by a cable 90 and tension spring 91, the cable being trained around a pulley 92 on frame 11. Reference numeral 93 indicates a turnbuckle. If upright member 30 swings to the right upon rightward movement of conveyor 22, cable 90 will pull upright 39 and conveyor 23 to the right. Similarly, leftward movement of conveyor 23 will cause leftward movement of conveyor 22 therewith. Tension spring 91 enables the conveyors to spread apart to pass large obstructions.

In FIG. 11, both uprights 30 and 39 are independently connected to frame 11 by tension springs 95 and 96, to bias the conveyors 22 and 23 towards each other centrally of the machine. The closure members 20 and 21 in pressing against each other will act as an outward compressive force on each other. If conveyor 22 is moved to the right, the closure pressure on the other will be relieved, so that spring 96 will cause conveyor 23 to move to the right, and vice versa. At the same time, the two tension springs 95 and 96 will allow the conveyors 22 and 23 to spread apart to accommodate large obstructions therebetween.

Having thus described out invention, we claim:

1. A machine for harvesting fruit from a row of fruited plants, comprising:
   a. a wheeled frame adapted to straddle and move longitudinally along said row,
   b. first and second conveyor means carried by said frame lengthwise thereof, one on each side of the longitudinal centerline of said frame,
   c. a pair of generally flat, elongated, flexible closure members, each one extending along and being secured along its outer edge to one of said conveyor means, and being upwardly inclined from said conveyor means towards said centerline of said frame, said closure members having a substantially lesser resistance to upward flexing at its inner edge than at its outer edge when unsupported.

2. A machine as set forth in claim 1, wherein said inner edges of said closure members are overlapped along the length thereof.

3. A machine as set forth in claim 1, wherein said inner edges of said closure members are scalloped along the length thereof.

4. A machine as set forth in claim 3, wherein said inner edges of said closure members are overlapped along the length thereof.

5. A machine as set forth in claim 1, including means impressing a longitudinal compressive force along the inner edges of said closure members.

6. A machine as set forth in claim 1, wherein said closure members are provided with transverse stiffening members longitudinally spaced along said closure members.

7. A machine as set forth in claim 6, wherein the transverse stiffening members of one of said closure members are longitudinally staggered with respect to the transverse stiffening members of the other of said closure members.

8. A machine as set forth in claim 6, including means impressing a longitudinal compressive force along the inner edges of said closure members.

9. A machine as set forth in claim 8, wherein the inner edges of said closure members are overlapped along the length thereof.

10. A machine as set forth in claim 9, wherein the inner edges of said closure members are scalloped along the length thereof.

11. A machine for harvesting fruit from a row of fruited plants, comprising:
    a. a wheeled frame adapted to straddle and move longitudinally along said row,
    b. a pair of closure members extending lengthwise of said frame, one on each side of the longitudinal centerline of said frame, said closure members each being inclined upwardly toward said centerline and having their inner edges overlapped centrally of said frame,
    c. a pair of conveyor means extending lengthwise of said frame, each of said conveyor means supporting the outer edge of one of said closure members,
    d. means suspending each of said conveyor means from said frame for movement of said conveyor means transversely of said frame,
    e. means for moving one of said conveyor means in a transverse direction relative to said frame in response to movement of the other conveyor means in the same direction.

12. A machine as set forth in claim 11, wherein said last-mentioned means also resiliently allows said conveyor means to be moved transversely away from each other.

13. A machine as set forth in claim 11 in which each of said closure members is formed of resilient material and has a lesser resistance to upward flexing at its inner edge than at its outer edge.

14. A machine as set forth in claim 13, wherein the inner edge of each of said closure members is scalloped along the length thereof.

15. A machine as set forth in claim 13, wherein said closure members are mounted on said conveyor means to impress a longitudinal compressive force along the inner edges of said closure members.

16. A machine as set forth in claim 13, wherein said closure members are each provided with transverse stiffening members longitudinally spaced along said closure members.

17. A machine as set forth in claim 16, wherein said closure members are mounted on said conveyor means to impress a longitudinal compressive force along the inner edges of said closure members.

18. A machine as set forth in claim 17, wherein the transverse stiffening members of one of said closure members are longitudinally staggered with respect to the transverse stiffening members of the other of said closure members.

19. A machine as set forth in claim 17, wherein the inner edge of each of said closure members is scalloped along the length thereof.